US012695217B2

(12) United States Patent
Sakagami et al.

(10) Patent No.: US 12,695,217 B2
(45) Date of Patent: Jul. 28, 2026

(54) TERMINAL BLOCK WITH REINFORCING RIB AND RELIEF GROOVE

(71) Applicant: YAZAKI CORPORATION, Tokyo (JP)

(72) Inventors: Ryo Sakagami, Shizuoka (JP); Ryosuke Murata, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 341 days.

(21) Appl. No.: 18/588,459

(22) Filed: Feb. 27, 2024

(65) Prior Publication Data

US 2024/0195089 A1 Jun. 13, 2024

Related U.S. Application Data

(63) Continuation of application No. PCT/JP2022/045257, filed on Dec. 8, 2022.

(30) Foreign Application Priority Data

Dec. 22, 2021 (JP) ................................ 2021-208008

(51) Int. Cl.
*H01R 9/18* (2006.01)
*H01R 9/24* (2006.01)

(52) U.S. Cl.
CPC ................ *H01R 9/18* (2013.01); *H01R 9/24* (2013.01)

(58) Field of Classification Search
CPC .................................. H01R 9/18; H01R 9/24
See application file for complete search history.

(56) References Cited

U.S. PATENT DOCUMENTS

| | | | | |
|---|---|---|---|---|
| 6,409,540 | B1 | 6/2002 | Kodama | |
| 2004/0266269 | A1* | 12/2004 | Miyazaki | H01R 13/512 439/660 |
| 2021/0296809 | A1* | 9/2021 | Yamamoto | H01R 9/223 |

FOREIGN PATENT DOCUMENTS

| | | | |
|---|---|---|---|
| JP | 10-228958 | A | 8/1998 |
| JP | 2015-042109 | A | 3/2015 |
| JP | 2017-195121 | A | 10/2017 |
| JP | 2019-169278 | A | 10/2019 |
| JP | 2021-150149 | A | 9/2021 |

* cited by examiner

*Primary Examiner* — Phuong K Dinh
(74) *Attorney, Agent, or Firm* — Sughrue Mion, PLLC

(57) ABSTRACT

A terminal block includes: a main body in which a conductor is accommodated; an attachment integrally projecting from the main body, the attachment being fastened and fixed to an attached body by a fastening member; and a rotation regulator in contact with a positioning part of the attached body to position the main body when the attachment is fastened to the attached body by the fastening member. The attachment has a recess at a root of the rotation regulator on a side in contact with the positioning part. The recess has a rounded surface at least on a side of the root of the rotation regulator.

3 Claims, 6 Drawing Sheets

TERMINAL BLOCK WITH REINFORCING RIB AND RELIEF GROOVE

CROSS-REFERENCE TO RELATED APPLICATIONS

The present application is a continuation of International Application No. PCT/JP2022/045257, filed on Dec. 8, 2022, and based upon and claims the benefit of priority from Japanese Patent Application No. 2021-208008, filed on Dec. 22, 2021, the entire contents of which are incorporated herein by reference.

TECHNICAL FIELD

The present invention relates to a terminal block.

BACKGROUND

Japanese Patent Publication No. 2015-42109 proposes a terminal block in which a housing as a terminal block main body made of a synthetic resin for accommodating a terminal as a conductor is attached and fixed to a fastened member as an attached body by fastening with a bolt. The terminal block has a pair of attachment flanges formed on an outer edge of the housing. A metal collar is fixed to a bolt insertion hole formed at a tip of the attachment flange by press-fitting. By inserting a bolt into the collar and fastening it into the bolt hole of the attached body, the terminal block is attached to the attached body and fixed.

SUMMARY OF THE INVENTION

Since the terminal block mentioned above is not provided with a reinforcing rib between the housing and the attachment flange, it is difficult to ensure the strength of the mounting flange. Further, in the terminal block mentioned above, the attachment flange co-rotates in a fastening direction when the attachment flange is fastened to the attached body by a bolt, which makes positioning of the terminal block relative to the attached body difficult, and the assembling workability is poor.

The disclosure is directed to a terminal block capable of accurately positioning a main body with respect to an attached body by preventing an attachment from co-rotating when the attachment is fastened to the attached body by a fastening member, and improving assembling workability and strength of the attachment.

A terminal block in accordance with the disclosure includes: a main body in which a conductor is accommodated; an attachment integrally projecting from the main body, the attachment being fastened and fixed to an attached body by a fastening member; and a rotation regulator in contact with a positioning part of the attached body to position the main body when the attachment is fastened to the attached body by the fastening member. The attachment has a recess at a root of the rotation regulator on a side in contact with the positioning part. The recess has a rounded surface at least on a side of the root of the rotation regulator.

According to the above-described configurations, when the attachment is fastened to the attached body by the fastening member, the main body can be accurately positioned relative to the attached body by preventing the attachment from co-rotating, and the assembling workability and the strength of the attachment can be improved.

DETAILED DESCRIPTION OF THE INVENTION

Hereinafter, a terminal block 10 according to an embodiment of the present invention will be described in detail with reference to the drawings.

Figure 1:
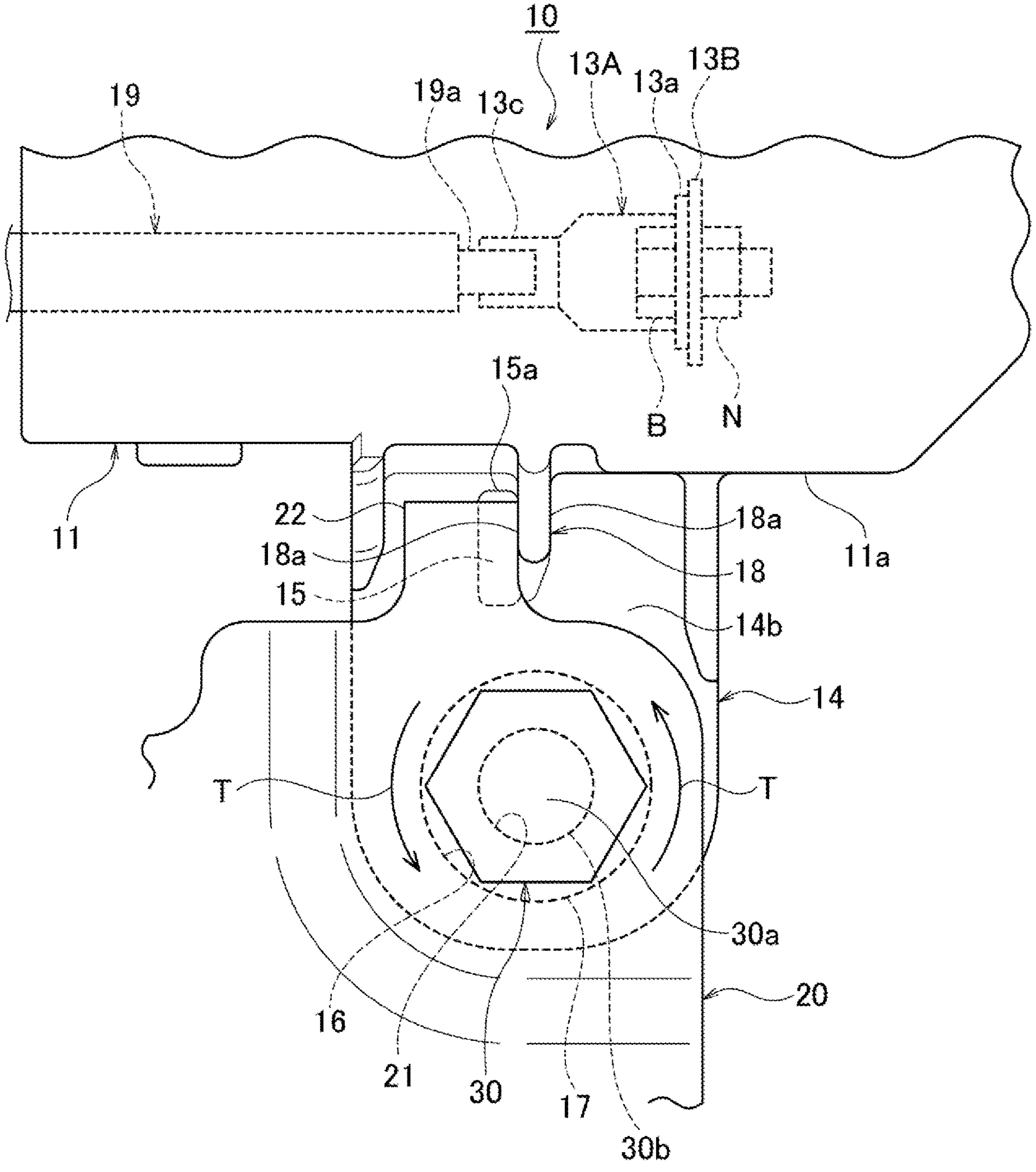
FIG. 1 is a partial bottom view showing an example of a terminal block according to an embodiment.
Figure 2:
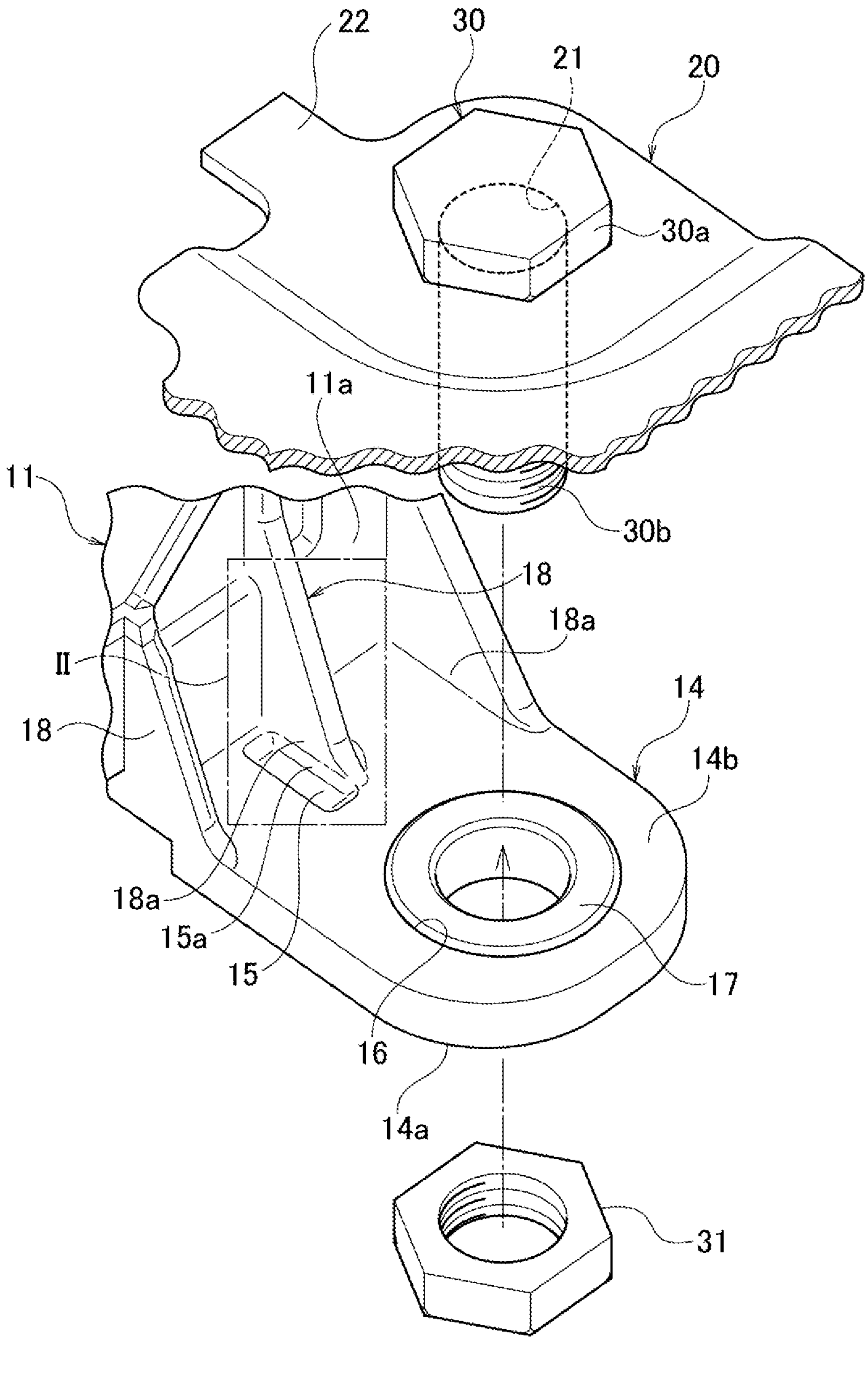
FIG. 2 is a perspective view of a periphery of a flange of the terminal block in FIG. 1 from a back side.
Figure 3:
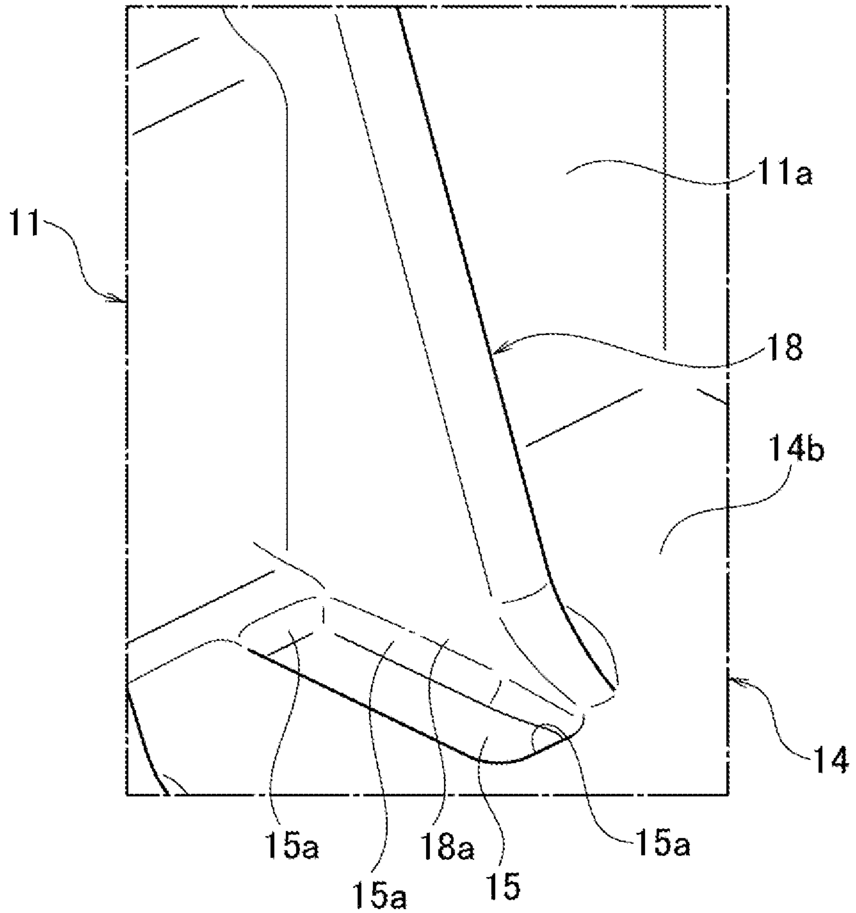
FIG. 3 is an enlarged perspective view of part II in FIG. 2.
Figure 4:
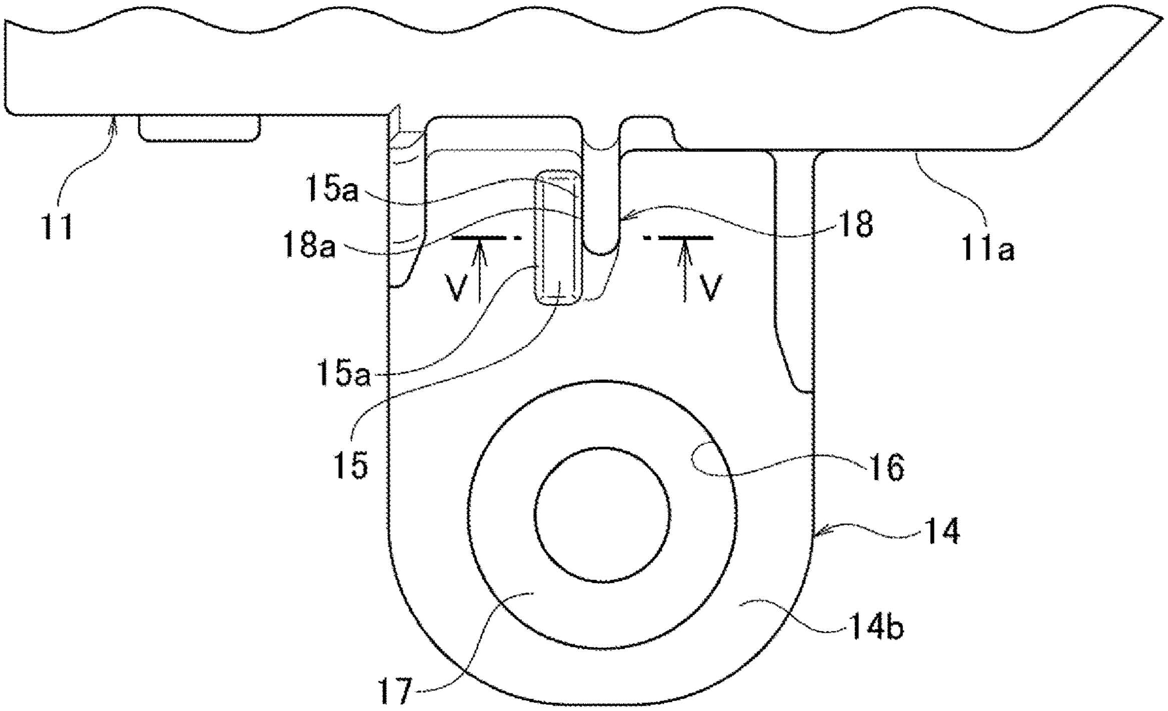
FIG. 4 is a bottom view around the flange in FIG. 2.
Figure 5:
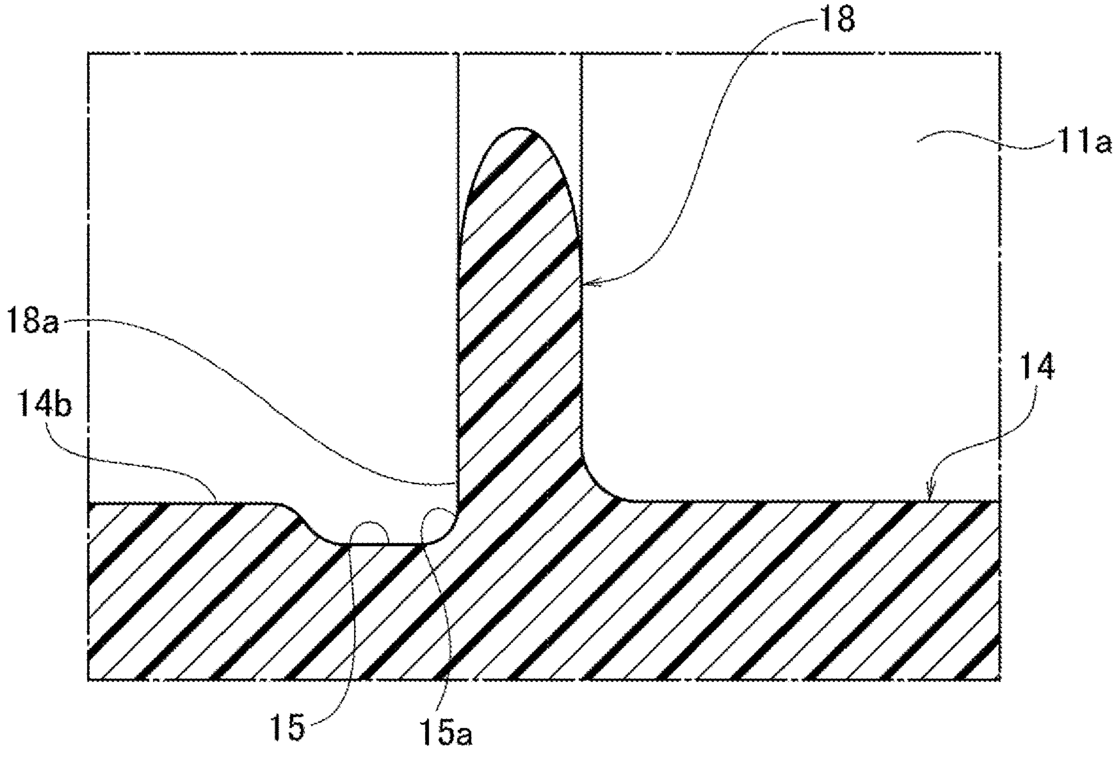
FIG. 5 is a cross-sectional view along the line V-V in FIG. 4.
Figure 6:
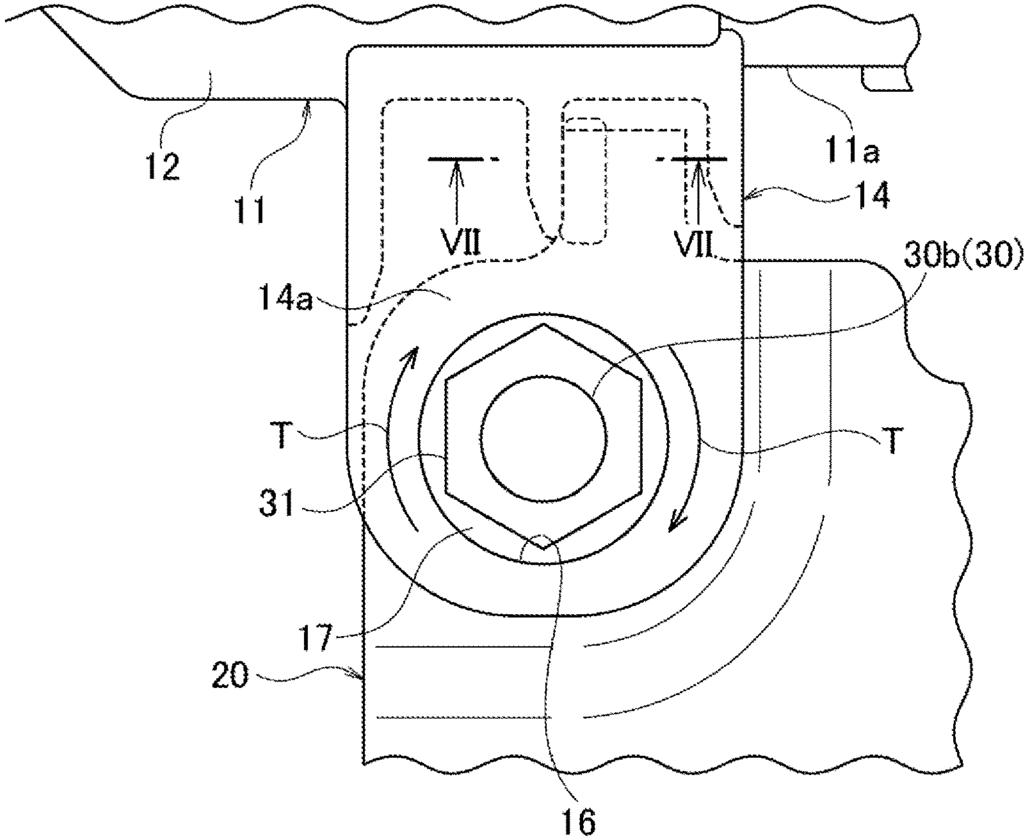
FIG. 6 is a plan view showing a fastened state of the flange in FIG. 2.
Figure 7A:
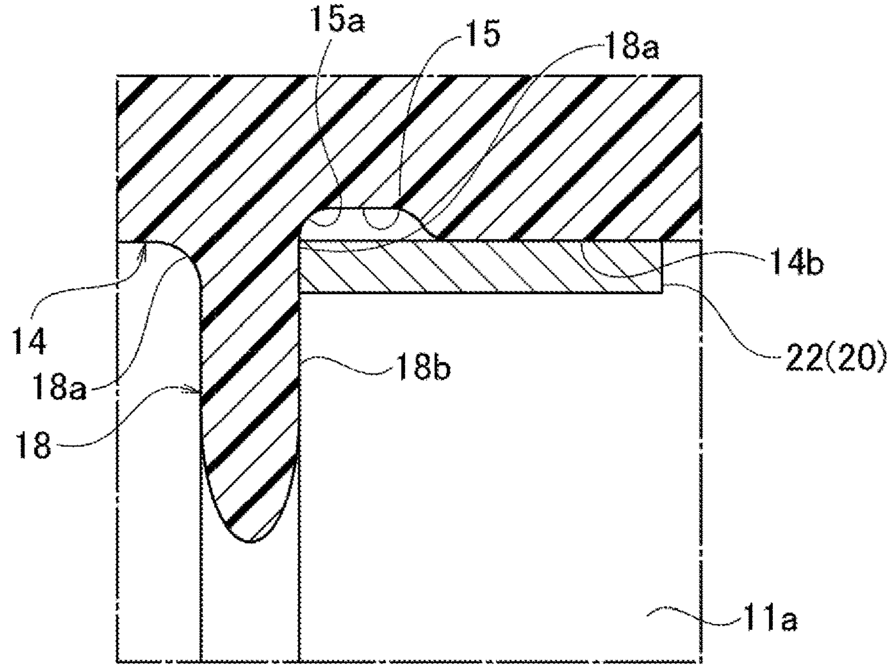
FIG. 7A is a cross-sectional view along the line VII-VII in FIG. 6.

FIG. 1 is a partial bottom view showing an example of a terminal block 10 according to an embodiment of the present invention. FIG. 2 is a perspective view of a periphery of a flange 14 of the terminal block 10 from the back side. FIG. 3 is an enlarged perspective view of part II in FIG. 2. FIG. 4 is a bottom view around the flange 14. FIG. 5 is a cross-sectional view along the line V-V in FIG. 4. FIG. 6 is a plan view showing a fastened state of the flange 14. FIG. 7A is a sectional view along the line VII-VII of FIG. 6.

As shown in FIGS. 1 and 6, the terminal block 10 includes a main body 11, a cover 12 covering an upper face opening of the main body 11, and a flange (attachment) 14 integrally protruding from the main body 11. The main body 11 is provided with a reinforcing rib (rotation regulator) 18 that positions the main body 11 when it is fastened to a sheet metal (attached body) 20 attached to a battery pack (not shown) by a bolt 30.

As shown in FIGS. 1 and 6, the main body 11 and the cover 12 are made of a block-like insulating resin material. A terminal (conductor) 13A and a bus bar (conductor) 13B are accommodated between the main body 11 and the cover 12. The terminal 13A and the bus bar 13B are formed of a conductive metal such as copper, copper alloy, aluminum, aluminum alloy, and the like. As for the terminal 13A and the bus bar 13B, the bus bar 13B is connected to a bent 13*a* of the terminal 13A by a bolt B and a nut N. A core wire 19*a* of an electric wire 19 is crimped and connected to an electric wire crimp contact 13*c* of the terminal 13A.

A pair of flanges 14 each integrally protrudes from each side wall 11*a* of both sides of the main body 11. The flanges 14 are fastened and fixed to a sheet metal (attached body) 20 as a fastened member through a bolt (fastening member) 30. The bolt 30 has a head 30*a* and a shank 30*b* inserted into a bolt through hole 21 formed in the sheet metal 20. As shown in FIG. 2, the flange 14 is fastened to the sheet metal 20 of a battery pack by a bolt 30 and a nut 31 through the bolt through hole 21. As shown in FIGS. 2 and 6, the nut 31 is arranged on an upper face (front face) 14*a* of the flange 14.

As shown in FIGS. 2 and 3, the flange 14 has a long relief groove (recess) 15 on a lower face (back face) 14*b*. The long relief groove 15 is formed along a root 18*a* of a reinforcing rib 18 on a side contacting a protrusion 22 as a positioning part of the sheet metal 20 described below. An R-surface (rounded surface) 15*a* is formed on a peripheral edge of the long relief groove 15.

The flange 14 has a circular bolt insertion hole 16 in a center thereof for inserting a bolt 30 for fastening and fixing. A cylindrical collar 17 made of metal is fixed to (fitted in) the circular bolt insertion hole 16 by press-fitting. As shown in FIG. 2, a shank 30*b* of the bolt 30 is inserted through the bolt through hole 21 of the sheet metal 20 from a side of the lower face 14*b* of the flange 14, and the collar 17 is in contact with the sheet metal 20 when the flange 14 is fastened to the sheet metal 20 by the bolt 30.

As shown in FIGS. 2 and 3, the reinforcing rib (rotation regulator) 18 is formed in a shape of a triangular plate between the side wall 11*a* of the main body 11 and the lower face 14*b* of the flange 14. When the flange 14 is fastened to the sheet metal 20 of the battery pack by the bolt 30, the reinforcing rib 18 has a function of contacting (abutting) the protrusion (positioning part) 22 of the sheet metal 20 to position the main body 11. The reinforcing rib 18 has a function of reinforcing the flange 14. The rounded surface 15*a* that is formed on a periphery of the long relief groove 15 at the root 18*a* of the reinforcing rib 18 on the lower face 14*b* of the flange 14 has a function of reinforcing the reinforcing rib 18.

According to the terminal block 10 according to the embodiment, as shown in FIGS. 6 and 7A, when the flange 14 is fastened to the sheet metal 20 of the battery pack by the bolt 30, the reinforcing rib 18 comes into contact with the protrusion 22 of the sheet metal 20, thereby preventing the flange 14 from co-rotating. By preventing the co-rotation, the body 11 can be accurately positioned relative to the sheet metal 20 of the battery pack, thereby improving assembly workability. Further, the long relief groove 15 is provided on the lower face 14*b* of the flange 14 at the root 18*a* of the reinforcing rib 18, and a rounded surface 15*a* is formed on the peripheral edge of the long relief groove 15. Thus, the strength of the reinforcing rib 18 can be improved.

Figure 7B:
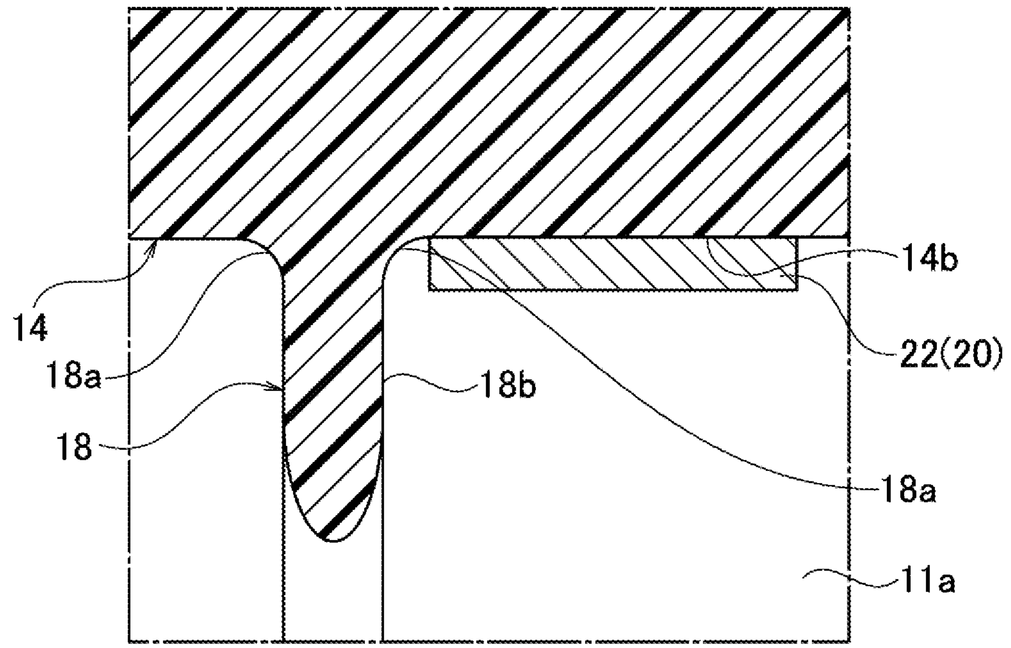
FIG. 7B is a cross-sectional view of a reference example corresponding to a cross-sectional view along the line VII-VII in FIG. 6.

In order to explain the superiority of the embodiment described above, a reference example is shown in FIG. 7B. FIG. 7B is a cross-sectional view of the terminal block of the reference example corresponding to the cross-sectional view along the line VII-VII in FIG. 6.

The terminal block of the reference example differs from the embodiment described above in that the long relief groove 15 is not formed on the lower face 14*b* of the flange 14 at the root 18*a* of the reinforcing rib 18, and the root 18*a* of the reinforcing rib 18 is formed on the rounded surface, but has otherwise a structure similar to the embodiment described above. Accordingly, the same components are denoted by the same reference numerals, and a detailed description thereof is omitted.

In the case of the reference example, the flange 14 is also fastened to the sheet metal 20 of the battery pack by a bolt. At this time, the reinforcing rib 18 comes into contact with the protrusion 22 of the sheet metal 20 of the battery pack, thereby preventing the flange 14 from co-rotating and determining the position of the main body 11 relative to the sheet metal 20 of the battery pack. However, at the time of fastening by the bolt, the protrusion 22 of the sheet metal 20 of the battery pack comes into contact with the root 18*a* in a rounded surface shape before a side surface 18*b* of the reinforcing rib 18. Therefore, the function of positioning is impaired, and the sheet metal 20 of the battery pack is not accurately positioned. In addition, if the root 18*a* is not formed in a rounded surface shape, the strength of the reinforcing rib 18 is impaired.

With the terminal block 10 according to the above embodiment, the problem of the above reference example can be solved. That is, as shown in FIGS. 1, 6 and 7A, when the flange 14 is fastened to the sheet metal 20 of the battery pack by the bolt 30, the side surface 18*b* of the reinforcing rib 18 contacts the protrusion 22 of the sheet metal 20 of the battery pack even when the flange 14 is rotated in a fastening direction T. By this contact, the flange 14 can be prevented from co-rotating and the body 11 can be accurately positioned relative to the sheet metal 20. Thus, the assembly workability can be improved.

By providing the long relief groove 15, the rounded surface 15*a* can be formed at the root 18*a* of the reinforcing rib 18, and thus the strength of the reinforcing rib 18 can be improved.

Although the present embodiments have been described above, the present embodiments are not limited thereto, and different variations are possible within the scope of the gist of the present embodiment.

For example, according to the embodiment described above, the collar 17 made of metal is fixed to the bolt insertion hole 16 of the flange 14 made of resin by press-fitting, but the collar 17 may be fixed to the flange 14 by insert molding.

According to the embodiment, the flange 14 of the main body 11 is fastened to the sheet metal 20 of the battery pack by a bolt, but the fastened member (the attached body) is not limited to the sheet metal 20 of the battery pack, and may be other members such as a car body panel.

Some embodiments of the present invention are described; however, the embodiments are provided as examples and are not intentionally provided to limit the scope to the invention. The novel embodiments can be realized in various other embodiments, and various omissions, replacements, or modifications can be performed within a range without departing from the gist of the invention. The embodiments or modifications thereof are included in the scope or the gist of the invention and are included in the invention and the scope equivalent to the invention described in claims.

What is claimed is:

1. A terminal block comprising:

a main body in which a conductor is accommodated;

an attachment integrally projecting from the main body, the attachment being fastened and fixed to an attached body by a fastening member; and a rotation regulator in contact with a positioning part of the attached body to position the main body when the attachment is fastened to the attached body by the fastening member, wherein the attachment has a recess at a root of the rotation regulator on a side in contact with the positioning part, the recess has a rounded surface at least on a side of the root of the rotation regulator, the rotation regulator is a reinforcing rib formed in a shape of a triangular plate located between a side wall of the main body and one of an upper face of the attachment or a lower face of the attachment, and the recess is a long relief groove formed along the root of the reinforcing rib in the shape of the triangular plate on the side in contact with the positioning part.

2. The terminal block according to claim 1, wherein the fastening member is a bolt, and the attachment is a flange having a bolt insertion hole through which the bolt is inserted.

3. The terminal block according to claim 2, further comprising a cylindrical collar made of metal fitted in the bolt insertion hole.

* * * * *